United States Patent
Pfeiffer et al.

(10) Patent No.: US 10,721,082 B2
(45) Date of Patent: Jul. 21, 2020

(54) SCREEN PRINTED PHOSPHORS FOR INTRINSIC CHIP IDENTIFIERS

(71) Applicant: INTERNATIONAL BUSINESS MACHINES CORPORATION, Armonk, NY (US)

(72) Inventors: Dirk Pfeiffer, Croton on Hudson, NY (US); Sami Rosenblatt, White Plains, NY (US); Chandrasekara Kothandaraman, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 652 days.

(21) Appl. No.: 15/212,932

(22) Filed: Jul. 18, 2016

(65) Prior Publication Data
US 2018/0017509 A1    Jan. 18, 2018

(51) Int. Cl.
*H04L 9/32* (2006.01)
*G06F 21/73* (2013.01)
*G06F 21/60* (2013.01)
*G06F 21/70* (2013.01)
*G06F 21/71* (2013.01)

(52) U.S. Cl.
CPC ............ *H04L 9/3278* (2013.01); *G06F 21/60* (2013.01); *G06F 21/70* (2013.01); *G06F 21/71* (2013.01); *G06F 21/73* (2013.01); *H04L 9/3271* (2013.01)

(58) Field of Classification Search
CPC .... G01N 23/22; G01N 23/223; A61B 6/4241; G01T 1/20; G01T 1/2006; G01T 1/2018; H04L 9/3278; H04L 9/3271; G06F 21/71; G06F 21/73; G06F 21/70; G06G 21/60
USPC ................ 378/44–50, 19, 98.8; 250/370.09; 235/454, 468
See application file for complete search history.

(56) References Cited

U.S. PATENT DOCUMENTS

| | | | | |
|---|---|---|---|---|
| 4,485,308 A * | 11/1984 | Rabatin | ..................... | B07C 3/14 250/271 |
| 5,299,252 A * | 3/1994 | Takahashi | ................ | G21K 1/04 378/151 |
| 5,693,947 A * | 12/1997 | Morton | ................... | G01T 1/185 250/370.09 |
| 6,043,486 A * | 3/2000 | Hossain | ................ | G01N 23/22 250/252.1 |
| 6,173,036 B1 * | 1/2001 | Hossain | ............... | G01N 23/223 378/45 |

(Continued)

OTHER PUBLICATIONS

Tuyls, P. et al., "Strong authentication with physical unclonable functions" in Security, Privacy, and Trust in Modern Data Management, Springer Berlin Heidelberg (Dec. 2006) pp. 133-148.

(Continued)

*Primary Examiner* — Allen C. Ho
(74) *Attorney, Agent, or Firm* — Tutunjann & Bitetto, P.C.; Vazken Alexanian (57) ABSTRACT

Methods and systems for generating an identifier include detecting emissions from a phosphor pattern with a sensor grid comprising one or more sensors when the phosphor pattern is stimulated with radiation. An output signal of each sensor in the sensor grid is compared to a threshold value to generate respective identifier bits. An identifier is generated from the identifier bits.

15 Claims, 5 Drawing Sheets

(56) References Cited

U.S. PATENT DOCUMENTS

| | | | | |
|---|---|---|---|---|
| 6,295,333 B1* | 9/2001 | Tamura | G01N 23/223 | 378/44 |
| 6,362,482 B1* | 3/2002 | Stettner | G01T 1/1644 | 250/370.08 |
| 6,384,409 B1* | 5/2002 | Libbey, III | G07D 7/12 | 235/468 |
| 6,477,227 B1* | 11/2002 | Kaiser | G01N 23/223 | 378/45 |
| 6,501,825 B2* | 12/2002 | Kaiser | G01N 23/223 | 378/44 |
| 6,850,592 B2* | 2/2005 | Schramm | G01N 23/223 | 162/57 |
| 6,858,148 B2* | 2/2005 | Warner | G01N 23/223 | 210/198.2 |
| 6,909,770 B2* | 6/2005 | Schramm | G01N 23/223 | 378/44 |
| 7,245,696 B2* | 7/2007 | Yun | B82Y 10/00 | 378/44 |
| 7,254,212 B2* | 8/2007 | Saitoh | B01D 46/0002 | 250/308 |
| 7,443,951 B2* | 10/2008 | Kenning | G01N 23/223 | 378/102 |
| 7,498,573 B2* | 3/2009 | Kaneyama | G01N 23/2252 | 250/310 |
| 7,508,499 B2* | 3/2009 | Potyrailo | B82Y 10/00 | 356/71 |
| 7,519,145 B2* | 4/2009 | Warner | G01N 23/223 | 378/47 |
| 7,607,584 B2* | 10/2009 | Kanevsky | G07C 9/00158 | 235/468 |
| 7,613,274 B2* | 11/2009 | Tkaczyk | A61B 6/032 | 378/19 |
| 7,623,621 B1* | 11/2009 | Schramm, Jr. | G01N 23/223 | 378/44 |
| 7,649,975 B2* | 1/2010 | Boyden | A61B 5/415 | 378/44 |
| 7,763,820 B1* | 7/2010 | Sommer, Jr. | B07C 5/342 | 209/576 |
| 7,769,138 B2* | 8/2010 | Dafni | A61B 6/4233 | 378/98.11 |
| 7,837,116 B2* | 11/2010 | Morrill Webb | B41M 3/14 | 235/487 |
| 7,898,648 B2 | 3/2011 | Ophey et al. | | |
| 7,968,853 B2* | 6/2011 | Altman | A61B 6/032 | 250/366 |
| 8,155,270 B2* | 4/2012 | Rohde | G01N 23/2252 | 378/82 |
| 8,213,566 B2* | 7/2012 | Roessl | A61B 5/4869 | 378/5 |
| 8,378,310 B2* | 2/2013 | Bornefalk | G06T 11/005 | 250/370.01 |
| 8,403,223 B2* | 3/2013 | Lewis | G06K 7/12 | 235/468 |
| 8,442,184 B2* | 5/2013 | Forthmann | A61B 6/032 | 378/5 |
| 8,755,488 B2* | 6/2014 | Levene | A61B 6/032 | 378/111 |
| 8,786,189 B2* | 7/2014 | Mayfield | H05B 37/0272 | 315/76 |
| 8,822,954 B2* | 9/2014 | Li | G07D 7/1205 | 250/459.1 |
| 9,052,266 B2* | 6/2015 | Miyazaki | A61B 6/4241 | |
| 9,214,183 B2 | 12/2015 | Van Rijnswou | | |
| 9,274,235 B2* | 3/2016 | Kang | G01N 23/04 | |
| 9,361,596 B2* | 6/2016 | Ross | G06K 9/20 | |
| 9,462,190 B2* | 10/2016 | Nishihara | H04N 5/32 | |
| 9,626,540 B1* | 4/2017 | Talyansky | G01N 21/64 | |
| 9,700,268 B2* | 7/2017 | Kang | A61B 6/542 | |
| 9,808,210 B2* | 11/2017 | Yamazaki | A61B 6/032 | |
| 9,854,656 B2* | 12/2017 | Göderer | G01N 23/046 | |
| 9,867,580 B2* | 1/2018 | Danielsson | A61B 6/4241 | |
| 9,903,890 B1* | 2/2018 | Sjolin | G01R 17/00 | |
| 10,019,565 B2* | 7/2018 | Ewing | G06F 21/44 | |
| 10,083,520 B2* | 9/2018 | Kim | G06K 9/78 | |
| 10,117,628 B2* | 11/2018 | Tamura | A61B 6/032 | |
| 10,126,167 B2* | 11/2018 | De Geronimo | G01J 1/44 | |
| 10,149,655 B2* | 12/2018 | Kato | A61B 6/032 | |
| 10,157,338 B2* | 12/2018 | Valdes Garcia | G06K 19/02 | |
| 10,159,450 B2* | 12/2018 | Kato | A61B 6/52 | |
| 10,165,995 B2* | 1/2019 | Eusemann | A61B 6/032 | |
| 10,182,775 B2* | 1/2019 | Nakai | A61B 6/483 | |
| 10,185,044 B2* | 1/2019 | Noshi | A61B 6/032 | |
| 10,206,638 B2* | 2/2019 | Nakai | A61B 6/4241 | |
| 10,217,246 B2* | 2/2019 | Takayama | G01N 23/046 | |
| 10,219,763 B2* | 3/2019 | Kojima | A61B 6/032 | |
| 10,401,309 B2* | 9/2019 | Yun | G01N 23/20075 | |
| 2008/0149700 A1 | 6/2008 | Tuyls et al. | | |
| 2008/0231418 A1 | 9/2008 | Ophey et al. | | |
| 2008/0237506 A1 | 10/2008 | Ophey et al. | | |
| 2015/0229482 A1 | 8/2015 | Pinkse et al. | | |
| 2015/0286914 A1 | 10/2015 | Kulikovska et al. | | |

OTHER PUBLICATIONS

Chong, C.N. et al., "Anti-counterfeiting with a random pattern" Second International Conference on Emerging Security Information, Systems and Technologies, SECURWARE'08 (Aug. 2008) pp. 146-153.

Jiang, D. et al., "Anti-counterfeiting using phosphor puf" IEEE 2nd International Conference on Anti-counterfeiting, Security and Identification, ASID (Aug. 2008) pp. 59-62.

* cited by examiner

SCREEN PRINTED PHOSPHORS FOR INTRINSIC CHIP IDENTIFIERS

BACKGROUND

Technical Field

The present invention generally relates to physically unclonable functions and, more particularly, to the use of variability in the screen-printing of phosphors to create a physically unclonable function.

Description of the Related Art

Physically unclonable functions (PUFs) are used to uniquely identify a piece of hardware by providing a unique identifying signal that is difficult to counterfeit. PUFs have the following basic properties: 1. They cannot be easily copied; 2. They are read out in a non-obvious manner (e.g., no optical readout); 3. They are unique; and 4. They generate a highly reproducible output, even with a fuzzy readout.

Existing attempts at creating PUFs suffer from a lack of reproducibility in measurement. In particular, it is difficult to ensure that the measurement of a given PUF will be consistent from one measurement to the next.

SUMMARY

A method for generating an identifier includes detecting emissions from a phosphor pattern with a sensor grid comprising one or more sensors when the phosphor pattern is stimulated with radiation. An output signal of each sensor in the sensor grid is compared to a threshold value to generate respective identifier bits. An identifier is generated from the identifier bits.

A method for generating an identifier includes illuminating a phosphor pattern that has substantial spatial variability in a density of phosphor material with soft x-rays having a wavelength between about 2 nm and about 20 nm. Emissions from the phosphor pattern are detected with a sensor grid directly above the phosphor pattern at a distance of about 1 µm. The sensor grid includes one or more sensors. An output signal of each sensor in the sensor grid is compared to a threshold value to generate respective identifier bits, assigning a logical '1' if the output signal of a sensor is above the threshold value and assigning a logical '0' if the output signal of a sensor is below the threshold value. An identifier is generated from the identifier bits. A color sensitivity of the sensor grid is changed. The illuminating, detecting, comparing, and generating steps are repeated to generate a second identifier.

A system for generating an identifier includes phosphor pattern that emits radiation when illuminated. A sensor grid has one or more sensors, with each sensor being configured to detect the radiation from the phosphor pattern. An identifier module is configured to compare an output signal of each sensor in the sensor grid to a threshold value, to generate respective identifier bits based on said comparison, and to generate an identifier from the identifier bits.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present invention provide physically unclonable functions (PUFs) in the form of screen-printed phosphor patterns. The screen-printing process, specifically when applied to phosphor particles embedded in a matrix, creates a significant amount of variability, such that the printed pattern will differ measurably from device to device. The pattern can be applied to an on-chip imaging sensor and activated by emissions through a device housing.

Figure 1:
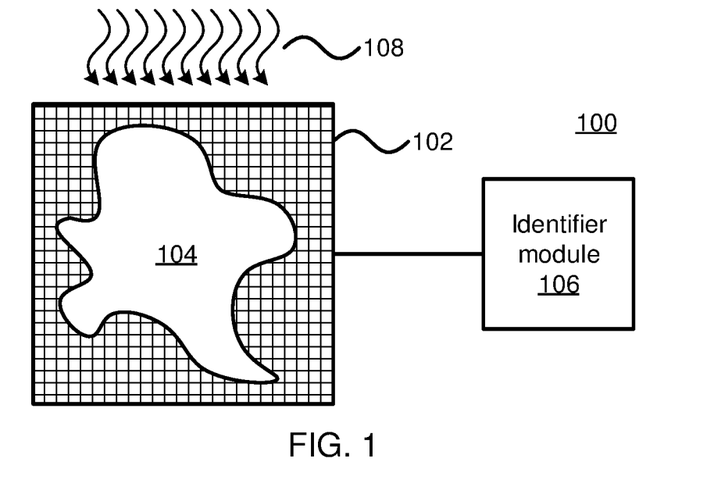
FIG. 1 is a diagram of a physically unclonable function (PUF) that is used to form an identifier in accordance with the present principles.

Referring now to FIG. 1, an exemplary PUF system 100 is shown. In particular, a screen-printed phosphor pattern 104 is applied over an imaging sensor grid 102. The imaging sensor grid 102 may be implemented with any appropriate sensor technology to form a grid that is, e.g., 100 pixels by 100 pixels. The sensor grid 102 may have a size that is selected in accordance with security needs, where a larger grid will provide additional identifier bits. In one specific embodiment, it is contemplated that the sensor grid 102 may occupy a physical area of about 500 µm by about 500 µm. It is furthermore contemplated that the sensor grid 102 may be formed on the back-end-of-line (BEOL) of an integrated chip (IC).

The phosphor pattern 104 is applied on a top layer of the IC, with no metallization layers being applied between the sensor grid 102 and the phosphor pattern. As noted above, screen printing process is used to deposit the phosphor particles onto the IC surface. A screen printing process uses a mesh to transfer the phosphor particles mixed with a suitable polymer matrix (e.g., ink) onto the IC, and the ink is then moved across the screen to form a layer of phosphor onto the IC. Due to variability in the particle size of the phosphors, as well as in the application of the ink itself, the number and composition of the phosphor particles vary across the surface, while the total thickness might be uniform. In particular, the amount of phosphor and the composition of phosphor particles deposited above each sensor in the sensor grid 102 may vary, producing a changing intensity and/or color response from sensor to sensor and from device to device when the respective device's phosphor pattern 104 is activated.

In a particular embodiment, the spacing between the sensor grid 102 and the phosphor pattern 104 is below 1 µm, but it should be understood that the spacing may be as much as 10 µm or more. The screen printing process uses an exemplary mesh size of about 100 µm, which is larger than the typical particle size of the phosphors (e.g., below 1 µm). It is specifically contemplated that the screen printing process may use an ink that is a polymer matrix having phosphor particles well-mixed within it. The resulting deposit of the phosphor pattern 104 has a uniform thickness and includes both the polymer matrix and the particles embedded within that matrix. The polymer matrix is then cured, resulting in a film having an exemplary thickness of about 10 µm, which is variable in the number and composition of phosphor particles.

When the phosphor pattern 104 is activated by radiation 108 at an appropriate wavelength, the phosphor material absorbs the radiation 108 and re-emits light at a longer wavelength. In one specific embodiment, it is contemplated that the radiation 108 may include soft x-rays having an exemplary wavelength between about 2 nm to about 20 nm that can, for example, penetrate a device casing or enclosure to activate the phosphor pattern 104 without having direct access to the internals of the device. The sensor grid 102 registers the re-emitted radiation from the phosphor pattern 104 and outputs a signal for each of the pixels in the sensor grid 102. In one exemplary embodiment, the output signal may indicate a radiation intensity.

It should be understood that the phosphor pattern 104 may emit radiation at one or more different wavelengths. This may be due to, for example, the inclusion of multiple different phosphor materials, stimulation by radiation at different wavelengths, etc. One consequence of this feature is that multiple identifiers can be extracted from a single phosphor pattern 104 to improve security. For example, the phosphor pattern 104 will produce a different identifier output if measured for intensity in red, green, and blue wavelengths respectively. A further measurement can be made that is insensitive to color and combines intensities from all wavelengths in a certain spectrum. Alternatively, the phosphor pattern may include two different types of phosphor particles which have different spectral emission, so that the final resulting illumination produces different intensities, at the same wavelength, for different pixels. Typical phosphor particles that emit in the visible spectrum, when excited by soft X-rays, include zinc sulfide, cadmium sulfide, gadolinium oxysulfide, cadmium telluride, etc.

An identifier module 106 collects information from each of the sensors in the sensor grid 102 and produces an identifier output. In one exemplary embodiment, the identifier module may compare the output signal from each of the pixels in the sensor grid 102 to a threshold value. For pixels that output a signal greater than the threshold value, the identifier module 106 may assign a logical '1', while for pixels that output a signal below the threshold value, the identifier module 106 may assign a logical '0." Thus, the identifier module 106 can create a unique, unclonable identifier for the device that is highly reproducible.

Figure 8:
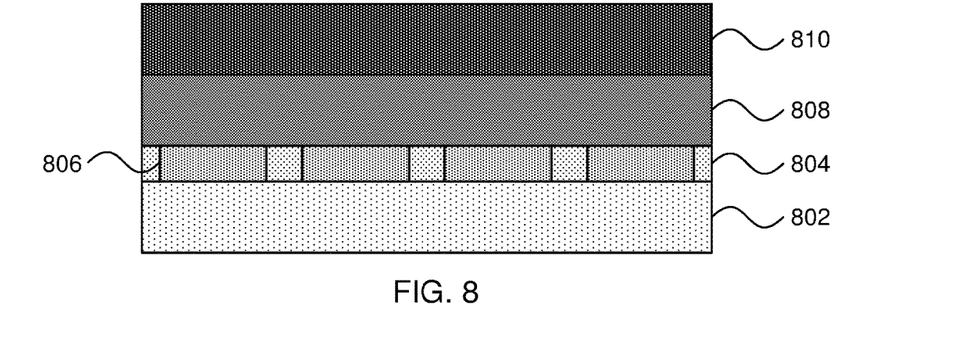
FIG. 8 is a diagram of a cross-sectional view of a PUF in accordance with the present principles.

Referring now to FIG. 8, a cross-sectional view of the PUF is shown. A set of sensors 806 are formed on a semiconductor substrate 802. The sensors 806 are formed in a layer 804 that may include, e.g., additional semiconductor material or a dielectric material. The phosphor pattern 104 is then formed as a phosphor layer 808 directly above the sensors 804. As noted above, the phosphor layer 808 may include phosphor particles embedded in a polymer matrix. An interlayer dielectric 810 is formed over the polymer layer for isolation, planarization, and encapsulation of the device.

The PUF can be integrated in a chip with other devices. In particular, the phosphor layer 808 may be formed in only an area directly above the sensors 802, leaving room on the semiconductor substrate 102 for other devices to be formed. In addition, conductive interconnects may be formed between the layers, providing for the ability to form front-end-of-line logic circuitry as well as back-end-of-line connections.

Figure 2:
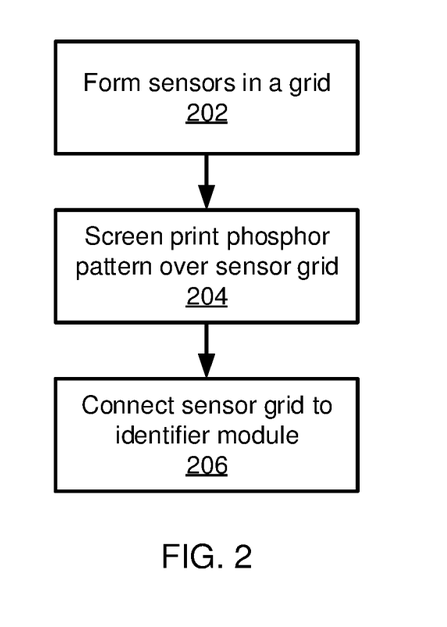
FIG. 2 is a block/flow diagram of a method of forming a PUF in accordance with the present principles.

Referring now to FIG. 2, a method of creating a PUF system 100 is shown. Block 202 forms a set of sensors on a PCB to form the sensor grid 202. The sensor grid 202 may be a uniform array of light detecting elements that are formed as, e.g., charge-coupled devices or complementary metal-oxide semiconductor pixel arrays. Additional layers may be deposited over the sensor grid 202, and then block 204 deposits a phosphor pattern 104 over the sensor grid 102. As emphasized above, the phosphor pattern 104 should be deposited using a process that exhibits a high degree of spatial variability, such as screen printing. Block 206 then connects the sensor grid 102 to the identifier module 106. This may be accomplished by, e.g., forming electrical interconnects above, below, or on a same layer as the sensor grid 202.

It is to be understood that the present invention will be described in terms of a given illustrative architecture; however, other architectures, structures, substrate materials and process features and steps may be varied within the scope of the present invention.

It will also be understood that when an element such as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The present embodiments may include a design for an integrated circuit chip, which may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer may transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

Methods as described herein may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Figure 3:
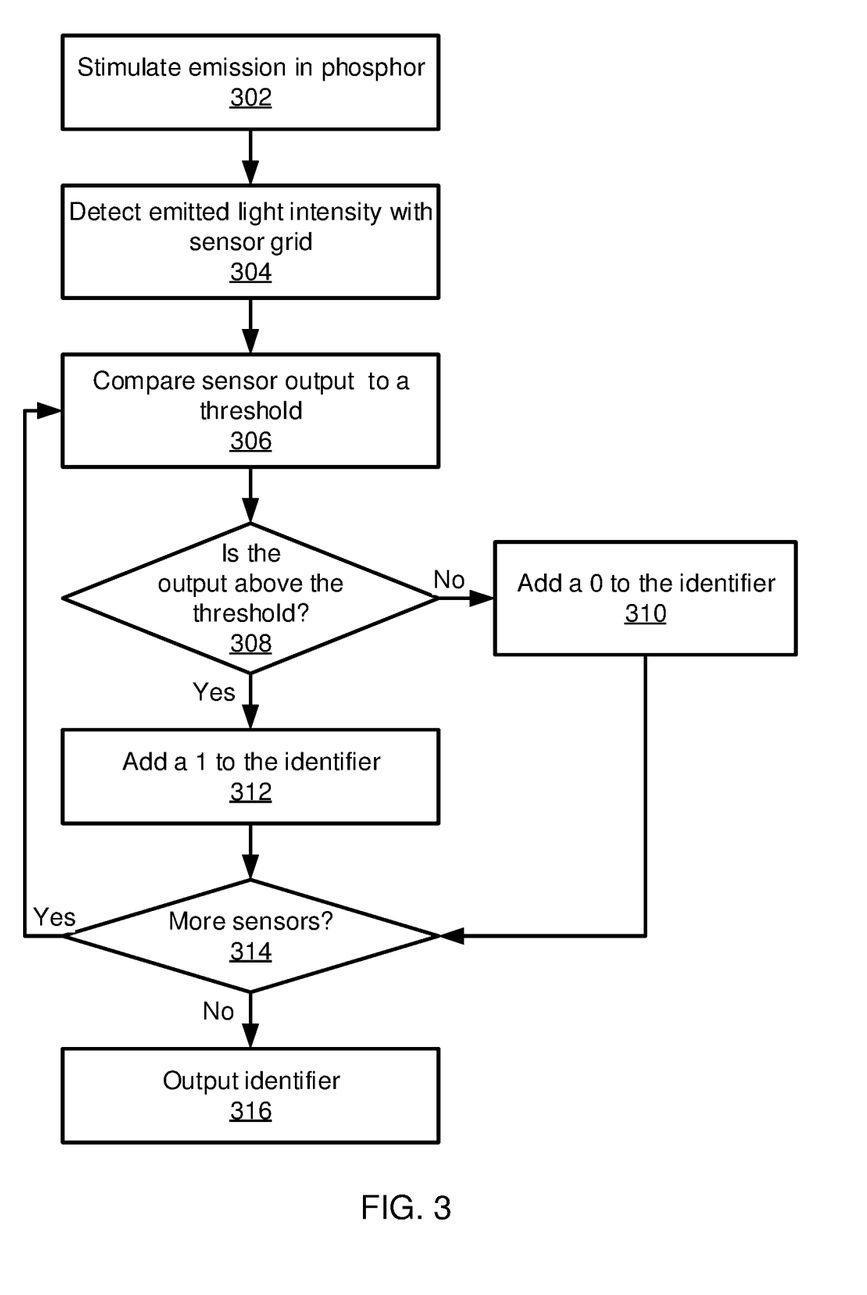
FIG. 3 is a block/flow diagram of a method of reading an identifier from a PUF in accordance with the present principles.

Referring now to FIG. 3, a method for generating an identifier is shown. Block 302 stimulates emission in the phosphor pattern 104. This may be accomplished by exposing the phosphor material of the phosphor pattern 104 to radiation at an appropriate wavelength which, in turn, causes the phosphor to reemit radiation at a longer wavelength. It is specifically contemplated that soft x-rays may be used for block 302, such that emission may be stimulated even through an optically opaque enclosure.

Block 304 detects the intensity of the emitted light with the sensor grid 102. Each sensor in the sensor grid 102 will produce a signal corresponding to the intensity of radiation that it receives. Block 306 picks one of those signals and compares it to a threshold value. Block 308 determines whether the sensor output is above or below the threshold. If the output is above the threshold, block 312 adds a logical '1' to the identifier, while if the output is below the threshold, block 310 adds a logical '0' to the identifier. Block 314 then determines whether any sensors have gone unchecked. If so, processing returns to block 306, which selects a next sensor output for comparison. If not, block 316 outputs the complete identifier bit string.

The process of FIG. 3 may be repeated multiple times, with block 306 measuring different wavelengths or ranges of wavelengths each time. This multiplies the number of identifier bits that are produced, thereby increasing the security of the identifier output.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 4:
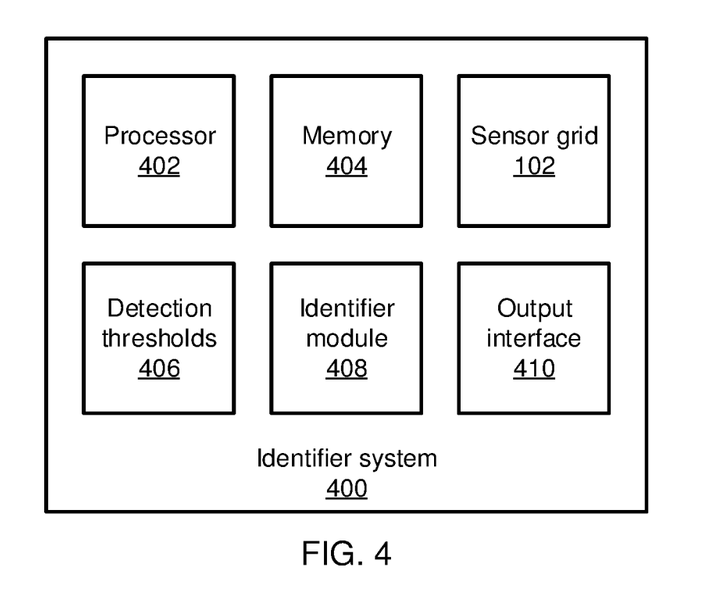
FIG. 4 is a block diagram of an identifier system in accordance with the present principles.

Referring now to FIG. 4, an identifier system 400 is shown. The identifier system 400 includes a hardware processor 402 and a memory 404. The identifier system 400 also includes the sensor grid 102, which is formed from one or more individual sensors. The identifier system 400 may further include one or more functional modules that are implemented as software that is stored in memory 404 and executed by hardware processor 402. In an alternative embodiment, the functional modules may be implemented as one or more discrete hardware components in the form of, e.g., application specific integrated chips or field programmable gate arrays.

An identifier module 408 reads outputs from the sensor grid 102 and compares those outputs to one or more detection thresholds 406. The identifier module 408 may be settable to consider particular outputs from the sensor grid 102. For example, if the identifier module 408 receives an instruction to consider only blue wavelengths, then the identifier module 408 will compare only blue-coded outputs from the sensor grid 102 and will compare those outputs to a respective blue-coded detection threshold 406. The identifier module 408 builds an identifier string based on each sensor output, assigning a logical '1' or '0' to each sensor in the sensor grid 102, and outputs the final identifier string using output interface 410.

Figure 5:
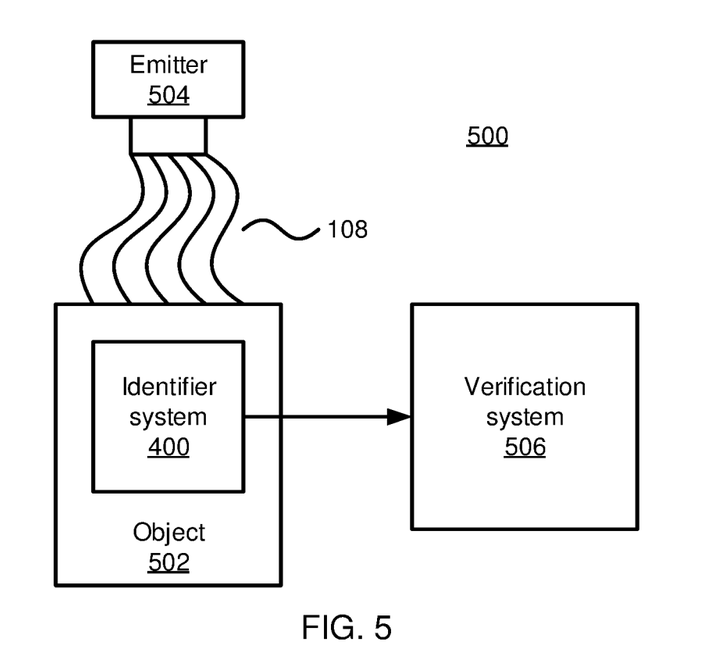
FIG. 5 is a diagram of a system for verifying an identifier in accordance with the present principles.

Referring now to FIG. 5, a sensing environment 500 is shown. It is specifically envisioned that the identifier system 400 with the phosphor pattern 104 printed over the sensor grid 102 will be installed in an object 502 that may include an electronic device or any other non-electronic object. The object 502 is placed under an emitter 504 that generates radiation 108 of the appropriate wavelength to stimulate emissions in the phosphor pattern 104. After detecting the radiation 108 and performing the processing described above, the identifier system 400 then outputs its identifier to a verification system 506. The verification system 506 uses the identifier to determine whether the object 502 is genuine and optionally controls the identifier system 400 with respect to, e.g., color testing settings.

Figure 6:
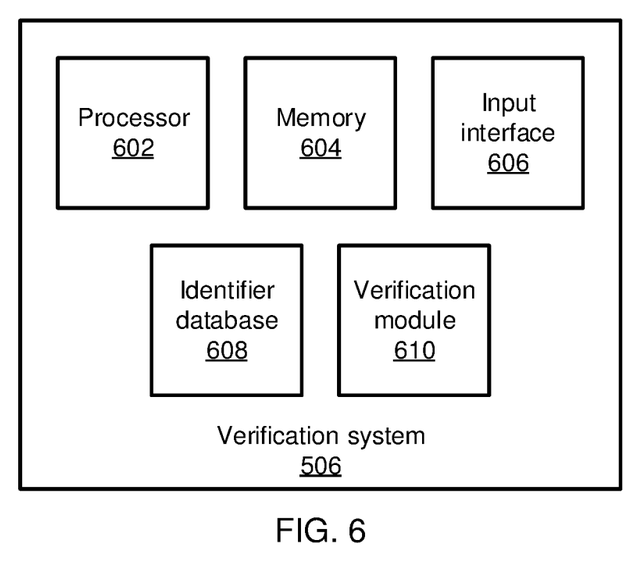
FIG. 6 is a block diagram of a verification system in accordance with the present principles.

Referring now to FIG. 6, further detail on the verification system 506 is shown. The verification system 506 includes a hardware processor 602 and a memory 604. The verification system 506 may further include one or more functional modules that are implemented as software that is stored in memory 604 and executed by hardware processor 602. In an alternative embodiment, the functional modules may be implemented as one or more discrete hardware components in the form of, e.g., application specific integrated chips or field programmable gate arrays.

An input interface 606 receives an identifier bit sequence from an identifier system 400. A verification module 610 uses a database of identifiers 608 to determine whether the identifier bit sequence is a valid identifier. If the identifier bit sequence is present in the identifier database 608, then the verification module 610 indicates that the object 502 is genuine. If the identifier bit sequence is not present in the identifier database 608, then the verification module 610 indicates that the object 502 is not genuine. In an alternative embodiment, the verification module 610 may request a further test using different color settings.

Figure 7:
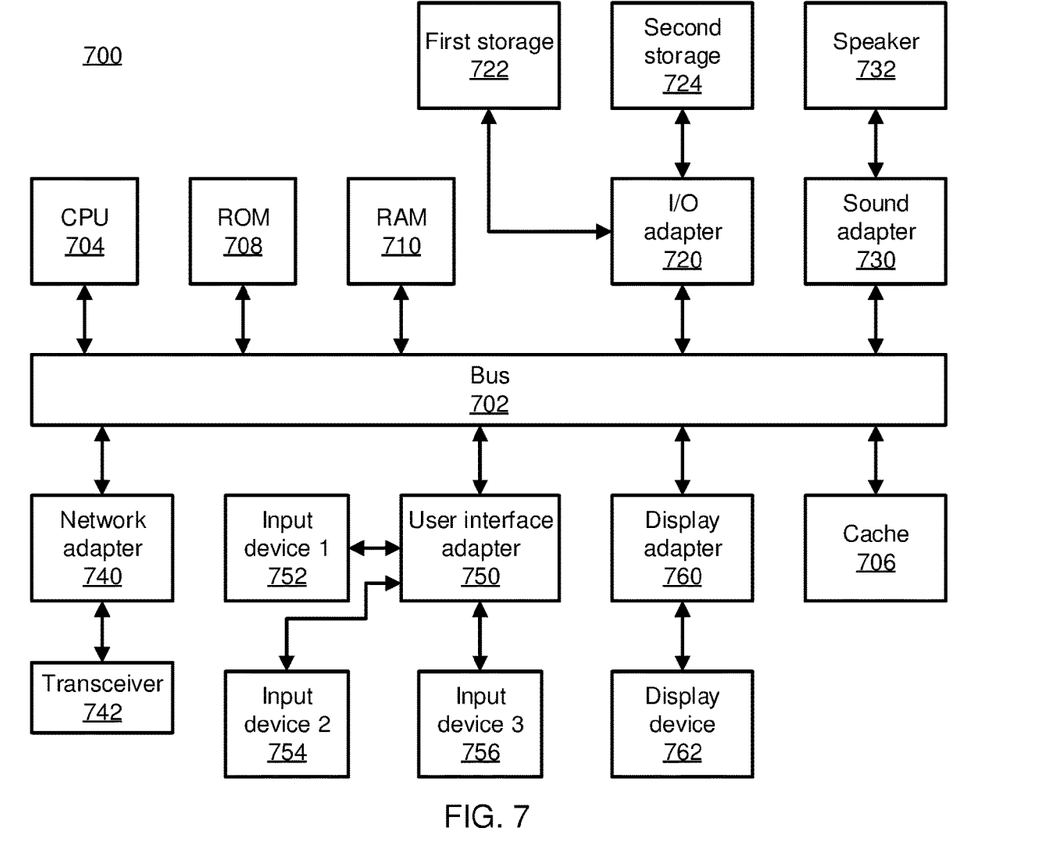
FIG. 7 is a block diagram of a processing system in accordance with the present principles.

Referring now to FIG. 7, an exemplary processing system 700 is shown which may represent the verification system 506. The processing system 700 includes at least one processor (CPU) 704 operatively coupled to other components via a system bus 702. A cache 706, a Read Only Memory (ROM) 708, a Random Access Memory (RAM) 710, an input/output (I/O) adapter 720, a sound adapter 730, a network adapter 740, a user interface adapter 750, and a display adapter 760, are operatively coupled to the system bus 702.

A first storage device 722 and a second storage device 724 are operatively coupled to system bus 702 by the I/O adapter 720. The storage devices 722 and 724 can be any of a disk storage device (e.g., a magnetic or optical disk storage device), a solid state magnetic device, and so forth. The storage devices 722 and 724 can be the same type of storage device or different types of storage devices.

A speaker 732 is operatively coupled to system bus 702 by the sound adapter 730. A transceiver 742 is operatively coupled to system bus 702 by network adapter 740. A display device 762 is operatively coupled to system bus 702 by display adapter 760.

A first user input device 752, a second user input device 754, and a third user input device 756 are operatively coupled to system bus 702 by user interface adapter 750. The user input devices 752, 754, and 756 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 752, 754, and 756 can be the same type of user input device or different types of user input devices. The user input devices 752, 754, and 756 are used to input and output information to and from system 700.

Of course, the processing system 700 may also include other elements (not shown), as readily contemplated by one of skill in the art, as well as omit certain elements. For example, various other input devices and/or output devices can be included in processing system 700, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 700 are readily contemplated by one of ordinary skill in the art given the teachings of the present principles provided herein.

Having described preferred embodiments of screen printed phosphors for intrinsic chip identifiers (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for generating an identifier, comprising:
    illuminating a phosphor pattern, which is screen printed onto a sensor grid, with soft x-rays having a wavelength between 2 nm and 20 nm;
    detecting emissions from the illuminated phosphor pattern with the sensor grid, which includes one or more sensors;
    comparing an output signal of each sensor in the sensor grid to a threshold value to generate respective identifier bits; and
    generating an identifier from the identifier bits.

2. The method of claim 1, wherein comparing an output signal of each sensor in the sensor grid to a threshold value to generate respective identifier bits comprises assigning a logical '1' if the output signal of a sensor is above the threshold value and assigning a logical '0' if the output signal of a sensor is below the threshold value.

3. The method of claim 1, wherein illuminating the phosphor pattern comprises illuminating the phosphor pattern through an optically opaque enclosure.

4. The method of claim 1, further comprising changing a color sensitivity of the sensor grid.

5. The method of claim 4, further comprising repeating said comparing and said generating of an identifier after changing the color sensitivity of the sensor grid to generate a second identifier.

6. The method of claim 1, wherein the phosphor pattern is directly above the sensor grid.

7. The method of claim 1, wherein a distance separating the sensor grid frown the phosphor pattern is less than 10 µm.

8. A non-transitory computer readable storage medium comprising a computer readable program for generating an identifier, wherein the computer readable program, when executed on a computer, causes the computer to perform the steps of:
    illuminating a phosphor pattern, which is screen printed onto a sensor grid, with soft x-rays having a wavelength between 2 nm and 20 nm;
    detecting emissions from the illuminated phosphor pattern with the sensor grid, which includes one or more sensors;
    comparing an output signal of each sensor in the sensor grid to a threshold value to generate respective identifier bits; and
    generating an identifier from the identifier bits.

9. A system for generating an identifier, comprising:
    a phosphor pattern that emits radiation when illuminated;
    an emitter, configured to illuminate the phosphor pattern with soft x-rays having a wavelength between 2 nm and 20 nm;
    a sensor grid comprising one or more sensors, each sensor being configured to detect the radiation from the phosphor pattern, wherein the phosphor pattern is screen printed onto the sensor grid; and
    an identifier module configured to compare an output signal each sensor in the sensor grid to a threshold value to generate respective identifier bits, and to generate an identifier from the identifier bits.

10. The system of claim 9, wherein the identifier module is further configured to assign a logical '1' if the output signal of a sensor is above the threshold value and to assign a logical '0' if the output signal of a sensor is below the threshold value.

11. The system of claim 9, further comprising an optically opaque enclosure, wherein the emitter is configured to illuminate the phosphor pattern through the optically opaque enclosure.

12. The system of claim 9, wherein the identifier module is further configured to change a color sensitivity of the sensor grid.

13. The system of claim 12, further wherein the identifier module is further configured to repeat said comparison and generation of an identifier after changing the color sensitivity of the sensor grid to generate a second identifier.

14. The system of claim 9, wherein the phosphor pattern is directly above the sensor grid.

15. The system of claim 9, wherein a distance separating the sensor grid from the phosphor pattern is less than 10 µm.

* * * * *